ELECTROSTATIC ELECTRON OPTICAL SYSTEM

Filed Sept. 16, 1963 3 Sheets-Sheet 1

INVENTOR:
KURT SCHLESINGER,

BY James J. Lichiello
HIS ATTORNEY.

INVENTOR:
KURT SCHLESINGER,
BY James J. Lichiello
HIS ATTORNEY.

INVENTOR:
KURT SCHLESINGER,
BY James J. Lichiello
HIS ATTORNEY.

United States Patent Office 3,327,160

Patented June 20, 1967

3,327,160

ELECTROSTATIC ELECTRON OPTICAL SYSTEM

Kurt Schlesinger, Fayetteville, N.Y., assignor to General Electric Company, a corporation of New York Filed Sept. 16, 1963, Ser. No. 308,951
15 Claims. (Cl. 315—17)

The present invention relates to improvements in all-electrostatic electron optical systems for scanning two-dimensional targets with orthogonally landing electron beams of high resolution, and particularly to an improved all-electrostatic electron optical system specifically suitable for use in picture signal generating tubes. More particularly, the invention relates to an improved picture signal generating tube of the type having all-electrostatic focus and deflection means for control of the electron beam.

A principal object of the invention is to provide an improved all-electrostatic electron optical system suitable for use in picture signal generating tubes and the like, which is capable of scanning two-dimensional charge storage targets with orthogonally landing electron beams of high resolution, e.g., capable of resolving 800 vertical and 1000 horizontal television lines per field, and with sufficiently large beam current to the target, e.g., 0.5 to 2 microamperes, to insure generation of an adequate readout signal current.

Another object of the invention is to provide an improved electrostatic camera tube of the photoconductive target type having high resolution, low power consumption, light weight, and small diameter.

Another object is to provide an electrostatic camera tube of the foregoing character having a high performance all-electrostatic system of electron optics.

Another object is to provide an electrostatic vidicon of high resolution, e.g., capable of resolving 800 vertical and 1000 horizontal television lines per field, and in which the quality of focus of the electron beam is substantially constant across the entire target area.

These and other objects of the invention will be apparent from the following description and the accompanying drawins wherein.

Figure 1:
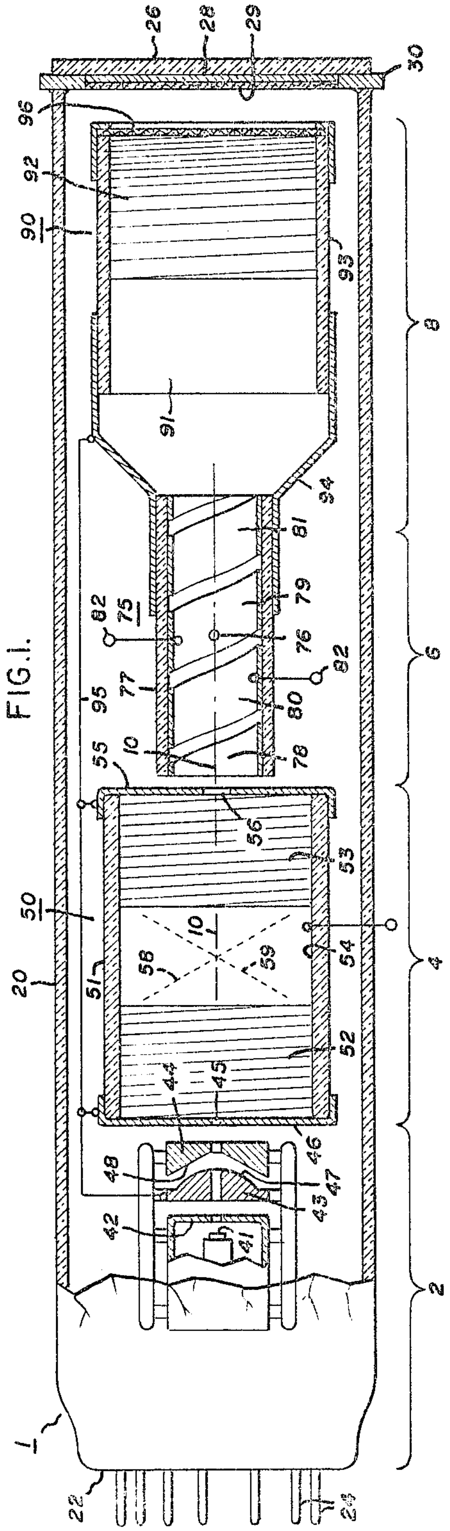
FIG. 1 is a cross-sectional illustration of one form of an all-electrostatic picture signal generating tube constructed in accordance with the present invention.

Referring to FIG. 1 of the drawing, this invention is shown in one preferred form as embodied in an all-electrostatic picture signal generating tube 1 of the vidicon type. This vidicon tube includes an electron beam generating section 2, a focusing section 4, an internal electrostatic deflection section 6, and a post-deflection focusing and collimating section 8. The various sections of the tube are arranged coaxially and serially in the order mentioned along a reference axis 10, and are enclosed within a coaxial envelope 20 having a generally cylindrical configuration. Envelope 20 is closed at its rearward or base end by a stem or header 22, which is provided with through prongs or leads 24 to the various electrodes, and is closed at its forward end by the viewing or target window 26. On the interior surface of window 26 is deposited a transparent conductor or signal plate 28 and a photosensitive target 29 of the photoconductive type such as, for example, antimony trisulfide ($Sb_2S_3$). Electrically connected to the signal plate 28 is a signal ring 30 which forms a portion of the wall of envelope 20 and through which the electrical output signal of the tube, in response to electron beam scanning of the target, is obtained as is well known to those skilled in the art.

The electron beam generating section 2 provides a coaxial electron beam of desirably small cross-section by generating and directing a strong beam current through a very small aperture, for example one-half mil diameter. The beam current must be sufficiently high, e.g., 5 to 10 microamperes, to insure, after losses in the focusing system, adequate beam currents at the target on the order of 2 to 6 microamperes, as desired for ample output signals. In the electron beam generating section 2, electrons are caused to be emitted from a relatively large cathode electrode 41. The emitted electrons pass through apertured collimator electrode 42, a first anode electrode 43, a gate electrode 44 which affords modulation or control of beam intensity, and through a small coaxial aperture 45 of a meniscus electrode 46. Aperture 45 serves as the spot-size defining aperture of the electron optical system. Anode 43 has a surface 47 which is convex or protruding in a forward direction, i.e., toward target 29. Surface 47 and the confronting concave or recessed surface 48 of the gate electrode 44 form a focusing electrostatic field. The equipotential surfaces of this field are substantially hyperboloids of revolution symmetrical with axis 10 and asymptotic to a rearwardly concave conical surface, whose apex faces tube end 22, of approximately 109° apex angle, and whose apex lies on the neck axis 10 adjacent central aperture 45 in the meniscus electrode 46. The characteristics of such a focusing electrostatic field are described in more detail in my U.S. Patent 2,995,676, assigned to the assignee of the present invention.

The condensing electrostatic lens field between the anode 43 and the gate electrode 44 forms, on the beam-entrance side of aperture 45, an effective virtual cathode of demagnified size relative to the actual cathode 41, and thus illuminates the aperture 45 with an electron beam of a density many times that of the emission density from actual cathode 41. Passage through the aperture 45 of ample electron beam current for desired signal output at the target 29 is thereby insured, even though aperture 45 may be extremely small, such as for example .0005 inch in diameter. In successful, operative tubes constructed as herein described, operating potential relative to the cathode 41 was about 10 volts on collimator 42, about 200 to 400 volts on anode 43 and meniscus 46, and about —20 to 0 volts on gate electrode 44. With voltages such as these, and with the spot-size defining aperture 45 having a diameter of about .0005 inch, currents were achieved through aperture 45 of 5 to 8 microamperes, corresponding to current densities of about 2 amperes per square centimeter. Emission density at cathode 41 was only about 0.2 ampere per square centimeter, a cathode emission density readily achievable with conventional oxide-coated cathodes.

The electron beam emerges from the spot-size defining aperture 45 into the focusing section 4. As shown in FIG. 1, section 4 includes a main focusing spiral lens 50 comprising an electrically insulating cylinder 51, a first spiral electrode 52 of constant pitch, a second spiral electrode 53 of constant pitch, and an electrically conductive band or sleeve 54 interposed between spiral electrodes 52 and 53. Spiral lens assembly 50 serves as the main focusing lens. Spiral electrodes 52 and 53 are preformed, or may be formed by a spiral coating of a predetermined electrical resistance paint supported on or attached to the interior surface of cylinder 51. Conductive band 54 of main focusing lens assembly 50 may be similarly provided on the interior surface of cylinder 51. Band 54 is electrically connected to the adjacent interior ends of spiral electrodes 52 and 53. The forward end of spiral electrode 53 is connected to an apertured electrode 55 having coaxial aperture 56 therein, while the rearward end of spiral electrode 52 is connected to meniscus electrode 46. Since electrodes 55 and 46 are maintained at the same potential, the electrons receive no net acceleration within main focusing lens assembly 50.

Figure 1A:
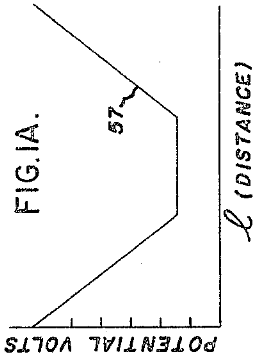
FIG. 1A is a voltage profile curve of the focusing section 4 of FIG. 1.

In operation, the rearward end of spiral electrodes 52 and the forward end of spiral electrode 53 are maintained at anode 43 potential while conductive band 54, and hence the interior or medial ends of spiral electrodes 52 and 53, are maintained at a potential substantially, e.g., several hundred volts, below the anode potential. The resultant voltage profile is shown in FIG. 1A adjacent section 4 as curve 57 and is an approximate parabola. This parabolic wall potential provides within support cylinder 51 field equipotential surfaces which are a biparted family of hyperboloids coaxial with axis 10, and coasymptotic with back-to-back conical loci, indicated by numerals 58 and 59 in section 4, having apex angles of about 109°. The field thus created by main focusing lens 50 provides improved convergence of the electron beam for better spot-size and greater beam current to target 29, without undesirable increase in net acceleration.

Figure 2:
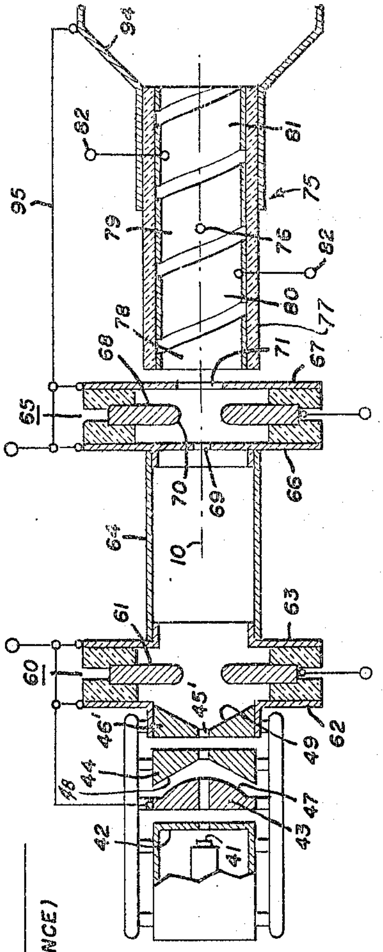
FIG. 2 is a cross-sectional illustration of a modification of the focusing section 2 of FIG. 1.

For the purpose of providing improved convergence of the electron beam emerging from the aperture 45, and thereby increasing beam current through the main lens 50, the alternative embodiment shown in FIG. 2 may be employed. In FIG. 2, the meniscus electrode 46′ has a concave coaxial conical surface 49 of about 109° apex angle apexed approximately at aperture 45′ and opening to target 29. The electron beam emerges from the spot-size defining aperture 45′ into a beam-converging prefocusing lens 60. Lens 60 may be a thin three-element einzellens, and is shown as consisting of a coaxially apertured center element or disk 61 with rounded edges which is positioned between tubular electrodes 62 and 63. Electrodes 62 and 63, anode 43, and surface 49 of meniscus electrode 46′ have the same potential, and the center element 61 is substantially reduced in potential so as to form a decelerating-accelerating equipotential lens. After leaving lens 60, the electron beam passes through a coaxial cylinder 64 defining a field-free space or drift tube, terminating at its forward end at a main focusing lens 65.

The main focusing lens 65, in the FIG. 2 embodiment, is a relatively thin decelerating-accelerating einzellens, and consists of three concentric apertured elements 66, 67 and 68. The two end electrodes 66 and 67 are at equal potentials and the center element or disk 68 is at a substantially reduced potential. The axial aperture 69 in the first electrode 66 serves as a stop, limiting beam diameter through the main focusing lens 65. The apertures 70 and 71 of the electrodes 67 and 68 respectively are larger, to avoid undue interception of beam electrons and undesired emission of stray secondary electrons.

Next adjacent the main focusing lens 50 of the FIG. 1 embodiment, or the main focusing lens 60 of the FIG. 2 embodiment, and in the direction toward target 29, is the electrostatic deflection section 6. The element of the electrostatic section 6 as well as those of the remaining section 8 are similar for either the FIG. 1 or FIG. 2 embodiments so that a description relative to FIG. 1 suffices for FIG. 2. Referring now to FIG. 2, electrostatic deflection section 6 includes an internal electrostatic deflection yoke 75 for deflecting the electron beam in both the horizontal and vertical coordinates of the target 29 from a common center of deflection 76 on the axis 10. The deflection yoke 75 includes a cylindrical insulative support 77 provided on its interior surface with two pairs of interlaced sinusoidal electrodes, a horizontal deflection pair 78 and 79, and a vertical deflection pair 80 and 81 which are individually supplied with suitable target-scanning deflection signals through leads such as 82 extending through support 77. Preferably the mentioned electrodes within support 77 are suitably shaped and arranged to minimize deflection related astigmatism or other electron-optical aberrations of the electron beam.

Next in order along the tube axis 10 in the FIG. 1 and FIG. 2 embodiments is the post-deflection and collimating section 8, the function of which is to collimate the deflected electron beam into paths parallel to the tube axis 10, for desired orthogonal or perpendicular arrival at the target 29 and to focus the beam. The collimating section 8 shown in FIG. 1 for example includes a collimating electrostatic lens means 90 formed by an electrically conductive sleeve or band 91 and a coaxial spiral electrode 92. Spiral electrode 92 is of non-linear pitch, having a turn-density, i.e., number of turns per unit of axial length, preferably changing from greater to lesser in a single step as illustrated. The turn-density may also increase progressively or incrementally in a direction toward target 29. Electrode 92 is shown supported by or attached to an electrically insulating cylinder 93. An electrically conductive support member 94 encloses the space between and attaches cylinder 93 and deflection yoke 75. Member 94 may also serve, with conductor 95 as an electrical connection between anode 43, meniscus 46, electrode 55 of lens 50 and electrode 91, in FIG. 1, and electrodes 94, 66 and 67 of lens 60 in FIG. 2. At its forward end the non-linear spiral electrode 92 terminates at a transverse mesh electrode 96, having the maximum accelerating potential of the electron optical system. Between mesh electrode 96 and target 29 a decelerating electrostatic field is formed to provide the low velocity landing of the electron beam which is known to be desirable for target readout.

The collimating electrostatic field formed in lens 90 within the non-linear spiral electrode 92 is particularly shaped and arranged to minimize spherical aberration of the beam. The equipotential surfaces of this field are preferably hyperboloids of revolution coaxial with the axis 10 and asymptotic to a coaxial forwardly-concave surface of approximately 109° apex angle between the non-linear spiral and the yoke 75, and having its apex located on axis 10 near the forward end of the yoke 75.

In the operation of the electron optical system thus far described, an electron beam from cathode 41 is condensed or demagnified in cross-section by the focusing field between anode 43 and gate 44, and supplied to spot-size defining aperture 45, forming near the aperture 45 a virtual cathode in which the electron beam current density is many times greater than that obtainable directly from cathode 41. The electron beam emerges from aperture 45, is focused by lens 50 of FIG. 1, or by lenses 60 and 65 in the embodiment of FIG. 2, and enters the deflection yoke 75. Scanning signals are supplied to electrodes 78, 79, 80 and 81, and the deflected beam then passes through the collimating and focusing field of collimating section 8, being decelerated after passing through mesh electrode 96 and making the desired orthogonal and soft landing on target 29. To secure the desired hyperboloidal equipotentials within collimating section 8, the electrical potential on the wall of cylinder 93, as provided by electrode 92, is variable so that preferably the axial potential within the collimating section 8 increases as a parabolic function of displacement along axis 10, with the maximum potential being at mesh 96.

To facilitate adjustment of the shape of the parabolic portion of the potential profile within collimating section 8, and thereby enable adjustment of the refractive power of section 8 for optimum perpendicularity of beam landing on target 29, the rearward end of electrode 92 may be electrically separated from the fixed potential of lens 50 in FIG. 1 or lens 60 in FIG. 2, and connected to an adjustable potential source. An alternative form of a collimating section 8 enabling such an adjustment of potential profile is shown in FIG. 3.

Figure 3:
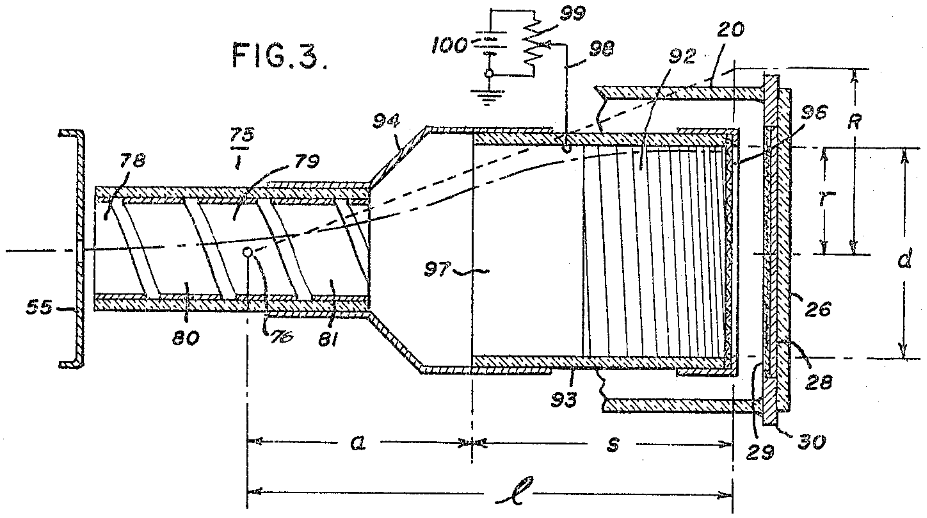
FIG. 3 is a cross-sectional illustration of an alternative embodiment of the right half portion of the electron optical systems of FIGS. 1 and 2.
Figure 4:
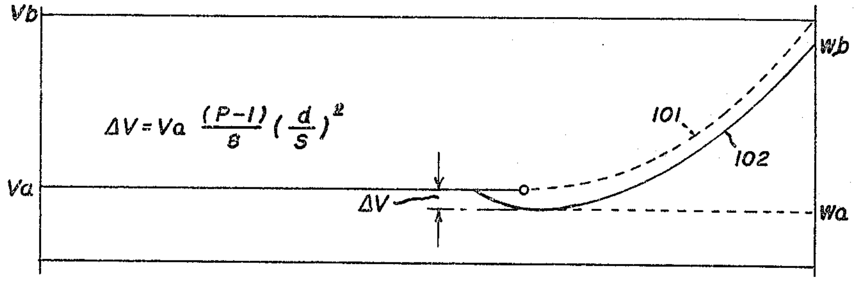
FIG. 4 is a graph showing certain exemplary voltage relationships applicable to the electron optical system of FIG. 3.

In FIG. 3 rearward end of electrode 92 is connected to an annular landing control electrode 97 and the landing control electrode 97 is connected through lead 98 and variable resistor 99 to a separate potential source 100. This permits the wall potential in the collimating section 8 to be separately regulated, as shown by curve 101 in FIG. 4, so as to produce the desired axial potential curve 102, and thereby facilitates control and adjustment of the collimating action of the collimating section of FIG. 3. The potential difference ΔV between wall and axis potential within landing control electrode 97 is shown in FIG. 4 and is given by the formula:

$$\Delta V = V_a \cdot \frac{(p-1)}{8} \cdot \left(\frac{d}{s}\right)^2$$

where $s$ and $d$ are as shown in FIG. 3, P is the post-acceleration ratio of voltage at mesh 96 to voltage on the landing control electrode 97, and $V_a$ is the anode voltage.

Figure 5:
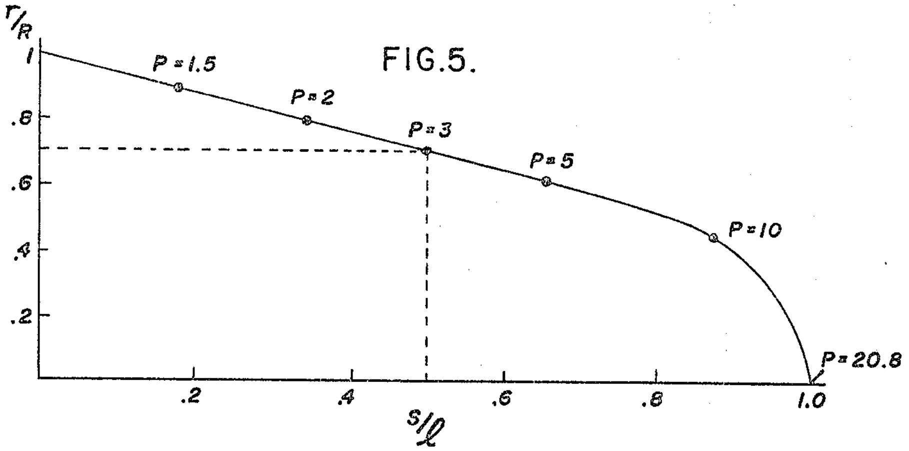
FIG. 5 is a graph illustrating certain dimensional and voltage relationships applicable to the electron optical system of FIG. 3.
Figure 6:
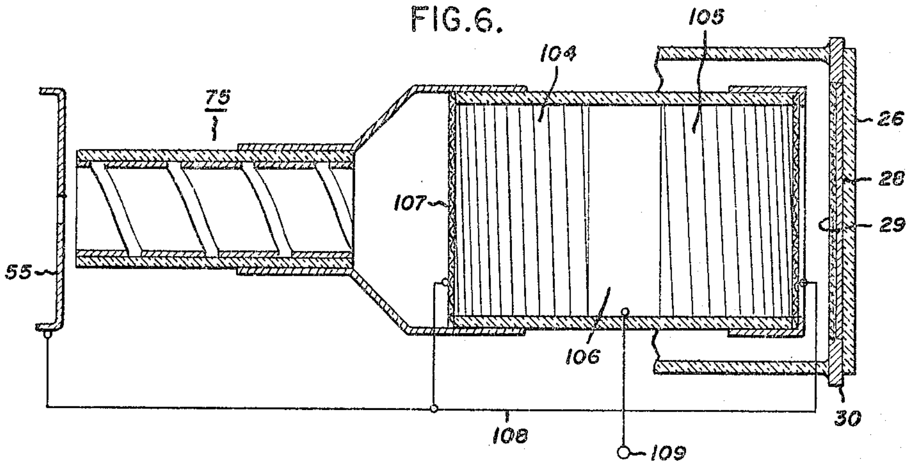
FIG. 6 is a cross-sectional illustration similar to FIG. 3 of another alternative form of a portion of the structure of FIGS. 1 and 2.

FIG. 5 shows graphically the effect on collimating action of the collimating section of FIG. 3, as the length $s$ of the collimating lens 90 in cylinder 93 is varied as a fraction of the entire length $l$ from the effective center of deflection 103 in yoke 75 to the plane of mesh 96. The ratio $r/R$ defines the deflection yield, since full target coverage after collimation requires a certain amount of overscan of the target. The dimension $r$ is the actual radius, as shown in FIG. 3, at which the collimated beam passes through the plane of mesh 96 and R is the radius at which the beam would pass through the plane of mesh 96 in the absence of collimation. The graph of FIG. 6 shows that as the length $s$ of the collimating section is decreased, the deflection yield increases and the post acceleration requirement decreases. Satisfactory operation has been attained for a post acceleration ratio of 3 to 1. At this point, as illustrated in FIG. 3, the spiral length $s$ and the drift space $a$ are equal and the deflection yield is 70 percent.

Another alternative form of collimating section is shown in FIG. 6 wherein the electrode 92 is replaced by two coaxial linearly spaced spiral electrodes 104 and 105 separated by a conductive cylindrical band 106. These electrodes 104 and 105 are closed at their center ends by a rear mesh electrode 107 and forward mesh electrode 96. Mesh electrodes 107 and 96 are directly electrically connected, by means of conductor 108, to electrode 55 of main focusing lens 50 in FIG. 1, or to electrode 67 of main focusing lens 65 in FIG. 2, so that the collimating section is non-accelerating. Band electrode 106 is connected to a separate source of lower potential (not shown) through conductor 109. Spiral electrode 104 decreases in turn-density in a direction rearwardly towards electrode 55, and spiral electrode 105 increases in turn-density towards target 29, thus providing a decelerating-converging lens within spiral electrode 104 and an accelerating, converging lens within spiral electrode 105. The resultant net effect of the structure of FIG. 6 is to provide collimation of the electron beam without net acceleration.

The chief advanage of the structure shown in FIG. 6 is ease of control of the degree of collimation by adjustment of only the potential of band 106. Another advantage lies in the lowering of the potential of mesh 96, the lowered potential of mesh 96 providing a consequent reduction in error of a readout signal from target 29 for a given degree of non-perpendicularity of electron beam landing on target 29.

Figure 7:
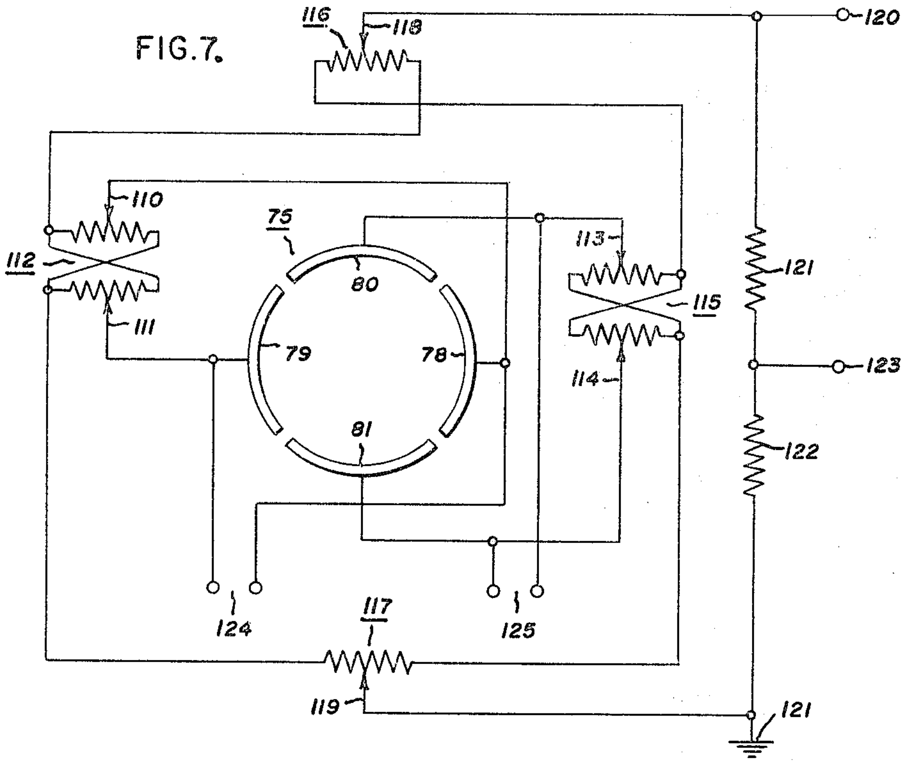
FIG. 7 is a schematic diagram of a control circuit useful with the electron optical systems of FIGS. 1 and 2.

For the purpose of permitting a shift in the $x$ or $y$ axis of the display and of providing precise vernier control of the cross-sectional shape of the electron beam, independent of the deflection voltages, the individual deflection electrodes of the deflection yoke 75 may be furnished with adjustable potentials. Control of the cross-sectional shape of the electron beam may be desirable to enhance spot roundness or otherwise adjust spot shape at target 29. Exemplary circuitry providing such astigmatism-correcting and axis-shafting potentials is shown in FIG. 7. The pair of horizontal deflection electrodes 78 and 79 of yoke 75, shown in the embodiments of FIGS. 1 and 2, are connected to ganged wipers 110 and 111 respectively of centering potentiometer 112. Vertical deflection electrodes 80 and 81 of yoke 75 are similarly connected to ganged wipers 113 and 114 respectively of centering potentiometer 115. Centering potentiometers 112 and 115 are energized through astigmation-control potentiometers 116 and 117, ganged wiper 118 of potentiometer 116 and ganged wiper 119 of potentiometer 117 being connected to terminal 120 and ground 121 respectively. An appropriate D.C. potential is applied to terminal 120. A voltage dividing network comprising resistors 121 and 122 of equal value is connected between terminal 116 and ground. A terminal 123 is connected to the common connection of resistors 121 and 122.

In operation, the horizontal and vertical deflection voltages are applied to terminals 124 and 125 respectively. Terminal 123 is connected to anode 43. Yoke 75 can generate uniform deflection fields only if the mean value of the voltages applied to the deflection electrodes is equal to the anode voltage. Thus, in shifting the $y$ axis, any change in voltage to horizontal deflection electrode 78 must be accompanied by an equal and opposite change in voltage to electrode 79. The same condition must be satisfied with respect to vertical deflection electrodes 80 and 81 in shifting the $x$ axis. Centering potentiometers 112 and 115 permit this condiiton to be satisfied. Movement of the ganged wipers 110 and 111 of centering potentiometer 112 will shift the $y$ axis of the display but the average voltage on horizontal deflection electrodes 78 and 79 will remain equal to the anode potential at terminal 123. Similarly, movement of ganged wipers 113 and 114 of centering potentiometer 115 will shift the $x$ axis of the display but the average voltage on vertical deflection electrodes 80 and 81 will remain equal to the anode potential at terminal 123. Thus, the mean voltage of electrodes 78–81 will remain equal to the anode potential for any adjustment potentiometers 112 and 115.

Control of the cross-sectional shape of the electron beam without changing its position or focal length can be effected by astigmation-control potentiometers 116 and 117. This control can be accomplished, while maintaining the mean voltage on the deflection electrodes equal to the anode voltage, by increasing the average voltage of one pair of deflection electrodes while decreasing the average voltage of the other pair an equal amount. Thus, upon movement of ganged wipers 118 and 119 of potentiometers 116 and 117 respectively the voltage difference between horizontal deflection electrodes 78 and 79 remains the same but the average potential of the electrodes is varied. Similarly, no change occurs in the voltage difference between vertical deflection electrodes 80 and 81 but the change in average potential of the vertical deflection electrodes is equal and opposite to the change in average potential of the horizontal deflection electrodes. Thus, contraction or expansion of beam width can be effected by lowering or raising the average potential of electrodes 78 and 79 while an opposite change of beam dimension in the vertical direction is simultaneously effected, independent of axes shift or beam deflection.

The electron optical system above described has many advantages particularly suitable for all-electrostatic picture signal generating tubes. The electron beam is immersed in a focusing and collimating electrostatic field throughout substantially its entire path from the deflection yoke 75 to the target 29, thus insuring maximum control of spot-size and perpendicularity of landing. The electrodes of collimating section 8 are so constructed and arranged as to provide a wide open, relatively large diameter space through which the electron beam travels, and the collimating electrodes may be readily placed directly on the interior surface of the tube envelope itself, thereby permitting minimum overall envelope diameter relative to desired target size. The collimating electrode structure is relatively short in an axial direction, thereby permitting the main focusing lens and the deflection yoke 75 to be positioned relatively far forward along the electron optical path, so as to provide maximum object distance and minimum image distance for the main focus lens, with resulting minimization of beam spotsize at the target for enhanced resolution. All the electrodes of the electron optical system may conveniently be coupled together by a series of resistors which may, if desired, be positioned inside the tube envelope 20. This arrangement permits all of the desired electrode potentials to be supplied by means of a minimum number of leads, all of which may enter envelope 20 through the stem 22 if desired. Moreover, the electron optical system is relatively insensitive to supply voltage fluctuations because operation of the system is more importantly dependent on ratios of electrode potentials rather than absolute values, and hence the deleterious effect of minor variations in absolute values of supplied potentials is minimized. Finally, the combination of effective collimation, throughout the target scanned area, of an electron beam deflected with a minimum of astigmatism from a common axial center of deflection, together with passage of beam current ample for good signal output through the tiny spot-size defining aperture 45, provides excellent resolution at the target with a minimum of undesired image shading or "porthole" effect.

It will be appreciated by those skilled in the art that the invention may be carried out in various ways and may take various forms and embodiments other than the illustrative embodiments heretofore described. Accordingly, it is to be understood that the scope of the invention is not limited by the details of the foregoing description, but is defined in the appended claims.

What I claim as new and desire to secure by Letters Patent of the United States is:

1. An electron optical system comprising, coaxially disposed along a reference axis, an electron beam source, electrostatic collimating lens means spaced from said beam source, and adapted to provide a collimating field having equipotential surfaces which are coasymptotic coaxial hyperboloids concave away from said beam source, electrostatic main focus lens means between said beam source and collimating lens means, and electrostatic deflection yoke means disposed between said collimating lens means and said main focus lens means and having a common axial center of deflection for deflection of said beam orthogonal to said axis in mutually perpendicular scanning coordinates.

2. An electron optical system comprising, coaxially disposed along a reference axis, an electron beam source, electrostatic collimating lens means spaced from said beam source and forming a space potential within said collimating lens means along said reference axis which increases as a parabolic function of displacement away from said beam source, the collimating field of said collimating lens means including equipotential surfaces which are coasymptotic coaxial hyperboloids concave away from said beam source, and electrostatic deflection yoke means disposed between said collimating lens means and said source and having a common axial center of deflection for deflection of said beam orthogonal to said axis in mutually perpendicular scanning coordinates.

3. An electron optical system comprising, arranged coaxially along a reference axis, an electron beam source including a cathode, a meniscus electrode spaced from the cathode and having a coaxial beam output aperture, and means between the cathode and meniscus electrode forming an electron beam condensing field having equipotentials which are a coasymptotic family of coaxial hyperboloids, an electrostatic deflection yoke spaced from said electron beam source and including a vertical deflection pair and a horizontal deflection pair of interlaced sinusoidal electrodes cylindrially disposed coaxial with said reference axis to provide a common deflection center on said axis for horizontal and vertical deflection; and an electrostatic main focus lens for said electron beam between said deflection yoke and said electron beam source.

4. An electron optical system comprising, arranged coaxially along a reference axis, means for generating an electron beam including a cathode, a meniscus electrode spaced from the cathode and having a coaxial beam output aperture, and means between the cathode and meniscus electrode forming an electron beam condensing field having equipotentials which are a coasymptotic family of coaxial hyperboloids; a main focus lens spaced from said output aperture; an electrostatic deflection yoke following the main focus lens for deflecting the electron beam to scan in two mutually perpendicular coordinates orthogonal to said axis with a common axial center of deflection; and a collimating lens following said deflection yoke including electrode means forming an electrostatic field whose equipotentials include at least one coaxial family of coasymptotic hyperboloids concave away from said cathode.

5. An electron optical system comprising, coaxially disposed along a reference axis, an electron beam source, electrostatic collimating lens means spaced from said beam source, the collimating field of said collimating lens means including equipotential surfaces which are coasymptotic coaxial hyperboloids concave away from electron beam source, electrostatic main focus lens means between said beam source and collimating lens means, electrostatic deflection yoke means disposed between collimating lens means and said main focus lens means and having a common axial center of deflection for deflection of said beam orthogonal to said axis in mutually perpendicular scanning coordinates, and an electron beam pre-focus lens between said beam source and said main focus lens means.

6. An electron optical system comprising, coaxially disposed along a reference axis, an electron beam source, a target normal to said axis adapted to be scanned by said electron beam, electrostatic main focus lens means between said beam source and target, electrosatic deflection yoke means disposed between the target and said main focus lens and having a common axial center of deflection for deflection of said beam on said target in mutually perpendicular scanning coordinates, electrostatic collimating lens means between said deflection yoke means and target forming a space potential therewithin along said reference axis which increases as a parabolic function of displacement toward said target, whereby the collimating field of said collimating lens means includes equipotential surfaces which are coasymptotic forwardly concave coaxial hyperboloids.

7. An electron optical system comprising, coaxially disposed along a reference axis, an electron beam source having a coaxial beam output aperture, a target normal to said axis adapted to be scanned by said electron beam, electrostatic main focus lens means between said beam output aperture and target, electrostatic deflection yoke means disposed between the target and said main focus lens and having a common axial center of deflection for deflection of said beam on said target in mutually perpendicular scanning coordinates, collimating lens means between said deflection yoke means and target forming a space potential therewithin along said reference axis which increases as a parabolic function of displacement toward said target, whereby the collimating field of said collimating lens means includes equipotential surfaces which are coasymptotic forwardly concave coaxial hyperboloids, and prefocusing lens means between the beam output aperture and said main focus lens means.

8. An electron optical system comprising, arranged coaxially along a reference axis, means for generating an electron beam including a cathode, a meniscus electrode spaced from the cathode and having a coaxial beam output aperture, and means between the cathode and meniscus electrode forming an electron beam condensing field having equipotentials which are a coasymptotic family of coaxial hyperboloids, a target normal to said axis adapted to be scanned by said electron beam, an electrostatic main focus lens for said electron beam between said beam output aperture and said target, an electrostatic deflection yoke between the target and main focusing lens including a vertical deflection pair and a horizontal deflection pair of interlaced sinusoidal electrodes cylindrically disposed coaxial with said reference axis to provide a common deflection center on said axis for horizontal and vertical deflection, a collimating lens following said deflection yoke including electrode means forming a refractive electrostatic field whose equipotentials include at least one coaxial family of forwardly concave coasymptotic hyperboloids, and prefocusing lens means between said output aperture and said main focus lens.

9. An electron optical system comprising, arranged coaxially along a reference axis, means for generating an electron beam including a cathode, a meniscus electrode spaced from the cathode and having a coaxial beam output aperture, and means between the cathode and meniscus electrode forming an electron beam condensing field having equipotentials which are a coasymptotic family of coaxial hyperboloids; a collimating lens for said electron beam including electrode means forming a refractive electrostatic field whose equipotentials include at least one coaxial family of forwardly concave coasymptotic hyperboloids, an electrostatic main focus lens for said electron beam between said beam output aperture and said collimating lens, an electrostatic deflection yoke between the collimating lens and main focusing lens including a vertical deflection pair and a horizontal deflection pair of interlaced sinusoidal electrodes cylindrically disposed coaxial with said reference axis to provide a common deflection center on said axis for horizontal and vertical deflection, and prefocusing lens means between said output aperture and said main focus lens.

10. An electron optical system comprising, arranged coaxially along a reference axis, means for generating an electron beam including a cathode, a meniscus electrode spaced from the cathode and having a coaxial beam output aperture, and means between the cathode and meniscus electrode forming an electron beam condensing field having equipotentials which are a coasymptotic family of coaxial hyperboloids; a target normal to said axis adapted to be scanned by said electron beam, an electrostatic main focus lens for said electron beam between said beam output aperture and said target, an electrostatic deflection yoke between the target and main focusing lens including a vertical deflection pair and a horizontal deflection pair of interlaced sinusoidal electrodes cylindrically disposed coaxial with said reference axis to provide a common deflection center on said axis for horizontal and vertical deflection, a collimating lens following said deflection yoke including electrode means forming a refractive electrostatic field whose equipotentials include at least one coaxial family of forwardly concave coasymptotic hyperboloids, and prefocusing lens means between said output aperture and said main focus lens, and a mesh electrode extending across the end of said collimating lens means remote from said deflection yoke.

11. In an electron optical system having a reference axis, an electrostatic deflection yoke including a vertical deflection pair and a horizontal deflection pair of interlaced electrodes disposed on a surface of revolution coaxial with said reference axis and having a common deflection center on said axis for horizontal and vertical deflection, means for introducing an electron beam into said deflection yoke along said axis for deflection by said yoke in vertical and horizontal coordinates orthogonal to said axis, and collimating lens means coaxially disposed adjacent the output end of said yoke, said collimating lens means being constructed and arranged to form a space potential therewithin along said reference axis which increases as a parabolic function of axial displacement away from said deflection yoke, whereby the equipotentials of the collimating field of said collimating lens conform substantially to a coasymptotic family of coaxial hyperboloids.

12. In an electron optical system having a reference axis, an electrostatic deflection yoke including a vertical deflection pair and a horizontal deflection pair of interlaced electrodes disposed on a surface of revolution coaxial with said reference axis and having a common deflection center on said axis for horizontal and vertical deflection, means for introducing an electron beam into said deflection yoke along said axis for deflection by said yoke in vertical and horizontal coordinates orthogonal to said axis, and collimating lens means coaxially disposed adjacent the output end of said deflection yoke, said collimating lens means including a coaxial cylindrical spiral electrode of pitch increasing nonlinearly in a direction away from said deflection yoke.

13. In an electron optical system having a reference axis, an electrostatic deflection yoke including a vertical deflection pair and a horizontal deflection pair of interlaced electrodes disposed on a surface of revolution coaxial with said reference axis and having a common deflection center on said axis for horizontal and vertical deflection, means for introducing an electron beam into said deflection yoke along said axis for deflection by said yoke in vertical and horizontal coordinates orthogonal to said axis, and collimating lens means coaxially disposed adjacent the output end of said deflection yoke, said collimating lens means including a coaxial cylindrical spiral electrode of pitch increasing non-linearly in a direction away from said deflection yoke, and a mesh electrode extending across the end of said collimating lens means remote from said deflection yoke.

14. In an electron optical system having a reference axis, an electrostatic deflection yoke including a vertical deflection pair and a horizontal deflection pair of interlaced electrodes disposed on a surface of revolution coaxial with said reference axis and having a common deflection center on said axis for horizontal and vertical deflection, means for introducing an electron beam into said deflection yoke along said axis for deflection by said yoke in vertical and horizontal coordinates orthogonal to said axis, and collimating lens means coaxially disposed adjacent the output end of said deflection yoke, said collimating lens means including electrode means forming a refractive electrosatic field whose equipotentials include at least one coaxial family of hyperboloids asymptotic to a coaxial cone concave away from said deflection yoke.

15. In an electron optical system having a reference axis, an electrostatic deflection yoke including a vertical deflection pair and a horizontal deflection pair of interlaced electrodes disposed on a surface of revolution coaxial with said reference axis and having a common deflection center on said axis for horizontal and vertical deflection, means for introducing an electron beam into said deflection yoke along said axis for deflection by said yoke in vertical and horizontal coordinates orthogonal to said axis, and electrostatic collimating lens means coaxially disposed adjacent the output end of said deflection yoke, said collimating lens means including electrode means forming a refractive electrostatic field whose equipotentials include at least one coaxial family of hyperboloids asymptotic to a coaxial cone concave away from said deflection yoke, and a mesh electrode extending across the end of said collimating lens means remote from said deflection yoke.

References Cited

UNITED STATES PATENTS

| | | | |
|---|---|---|---|
| 2,827,592 | 3/1958 | Bramley | 315—14 |
| 2,995,676 | 8/1961 | Schlesinger | 315—15 |
| 3,040,205 | 6/1962 | Walker | 315—31 X |
| 3,143,681 | 8/1964 | Schlesinger | 315—31 X |
| 3,240,973 | 3/1966 | Stone | 315—15 X |

DAVID G. REDINBAUGH, *Primary Examiner.*

T. A. GALLAGHER, *Assistant Examiner.*